(12) United States Patent
Schlumberger et al.

(10) Patent No.: US 6,609,177 B1
(45) Date of Patent: Aug. 19, 2003

(54) METHOD AND APPARATUS FOR EXTENDING CACHE HISTORY

(75) Inventors: Maurice Schlumberger, Menlo Park, CA (US); Serge Shats, Palo Alto, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/439,778

(22) Filed: Nov. 12, 1999

(51) Int. Cl.[7] .............................................. G06F 12/08
(52) U.S. Cl. ........................................ 711/122; 711/119
(58) Field of Search ........................ 711/119–122, 123, 711/129, 144, 145; 712/240

(56) References Cited

U.S. PATENT DOCUMENTS

| | | | |
|---|---|---|---|
| 5,493,663 A | | 2/1996 | Parikh |
| 5,619,675 A | | 4/1997 | De Martine et al. |
| 5,640,531 A | * | 6/1997 | Whittaker et al. ........... 711/118 |
| 5,696,925 A | * | 12/1997 | Koh ............................ 711/202 |
| 5,809,560 A | | 9/1998 | Schneider ................... 711/204 |
| 5,822,755 A | * | 10/1998 | Shippy ........................ 711/118 |
| 6,078,992 A | * | 6/2000 | Hum ........................... 711/120 |
| 6,148,368 A | * | 11/2000 | DeKoning ................... 710/53 |
| 6,256,727 B1 | * | 7/2001 | McDonald .................. 712/205 |

* cited by examiner

*Primary Examiner*—B. James Peikari
(74) *Attorney, Agent, or Firm*—Anthony L. Miele; Palmer & Dodge, LLP

(57) ABSTRACT

Cache history is extended by retaining access history information for storage locations in the underlying level that are no longer represented in the cache. A cache is provided having a plurality of cache entries. Each of the cache entries has cache entry address information. A cache extender is provided having, a plurality of extender entries. Each extender entry has an extender address portion and an extender auxiliary portion. Each extender address portion may have extender entry address information. The cache entry address information of each of the cache entries relates to the extender entry address information of one among the extender address portions, and a storage area of an underlying level of a memory hierarchy is related to the extender entry address information of each of the extender address portions. Additionally, each of the extender auxiliary portions has historical information.

47 Claims, 23 Drawing Sheets

METHOD AND APPARATUS FOR EXTENDING CACHE HISTORY

BACKGROUND OF THE INVENTION

1. Field of the Invention

This invention relates to caches for use in computing environments.

2. Description of Background Information

At its most basic level, a computing environment is made up of (1) a storage area to maintain data and instructions and (2) one or more processing units to execute the instructions and to consume and produce data in accordance with those instructions. One goal in a computing system is to maintain efficient operation by providing the necessary data and instructions to the processing units as quickly as possible. Therefore, the ideal storage area would contain an unlimited amount of fast memory such that any piece of information within the system would be instantly available to the processing units as needed.

However, a certain access delay is associated with any type of storage device, and access delays tend to increase with device capacity. With reference to the year 1999, for example, semiconductor random-access memory (RAM) chips have capacities measured in megabytes and access delays measured in microseconds ($10^{-6}$ s), while disk drives have capacities of gigabytes but access delays measured in milliseconds ($10^{-3}$ s). Moreover, the cost per storage element is inversely related to device capacity and access delay, so that fast storage devices such as semiconductor RAM chips also tend to be more expensive (e.g. in terms of cents per bit) than slower, large-capacity devices such as disk and tape drives. Access delays are also dependent upon the nature of the interface between the processing units and the storage device; for example, information may be obtained much more quickly from an level 1 (CPU) or level 2 (memory) cache over a chip-level bus than from main memory over a board-level local or system bus or from a disk drive over a peripheral bus cable.

In order to create the illusion of an affordable memory that is both large and fast, the storage area of a modern computing system is commonly configured as a memory hierarchy wherein the upper levels are closer to the processor, run faster, and have more limited capacities than the lower levels. FIG. 1 shows a block diagram of a computing system comprising a processor 100 and a memory hierarchy 110 including a cache 120, main memory 130, and secondary memory 140. In such familiar examples as a personal computer or a file server, the cache and main memory are typically implemented in semiconductor RAM memory, while the secondary memory may include slower devices, such as magnetic and/or optical disk drives (e.g. floppy disk, hard disk or Winchester, so-called 'floptical,' phase-change, CD-ROM, and CD-RW drives and the like) and similar mass storage devices that can be either removable, dedicated, or shared over a network. One common configuration is shown in FIG. 1A, wherein processor 100, cache 120, and main memory 130 are components of host 10, which interfaces as a discrete unit with storage device 170 (e.g. a disk drive as indicated above).

Memory hierarchies leverage the principles of locality in order to create the illusion of a large memory that may be accessed rapidly. The principle of locality in time states that if a storage element is accessed, it will probably be accessed again soon. The principle of locality in space states that if a storage element is accessed, nearby storage elements will probably be accessed soon. In order to exploit these localities, each level of a memory hierarchy stores information from one or more lower levels that is local to information that has been accessed in the past and therefore is more likely to be accessed in the near future.

In FIGS. 1 and 1A, cache 120 exploits the principles of locality by storing, in a location quickly accessible to processor 100, information from the levels below which is likely to be accessed soon. A cache may also be applied between any two levels of the memory hierarchy. As shown in FIG. 2, for example, a cache 160 may be added at the interface between the main memory 130 and secondary memory 140. In this way, the average delay encountered when accessing a device within secondary memory 140 (such as a disk drive) may be reduced. In such applications, cache 160 stores information that is local to information previously accessed from secondary memory 140.

Cache 160 may be addressed over a system bus as a part of main memory 130, as in the example system shown in FIG. 2A, where the secondary memory is represented by storage device 170 (e.g. a magnetic and/or optical disk drive) and host 10 communicates with the storage device over a peripheral bus 172 such as a SCSI, IDE, PCMCIA, IEEE 1394, Universal Serial or Fibre Channel bus. In this case, cache 160 may be a dedicated hardware unit collocated with main memory 130 of the host machine or may even be implemented within such memory (i.e. cache 160 being defined at least in part by firmware or software).

In the alternative, cache 160 may be addressed over a peripheral bus as a part of secondary memory 140 as illustrated in FIG. 2B, wherein cache 160 is addressed over peripheral bus 172 as a part of storage device 170. In this case, it is possible for the operations of cache 160 to be completely transparent to host 10.

As shown in FIG. 3, a cache 190 may be implemented in the same manner at the interface between a local memory system 180 (e.g. memory hierarchy 110 in FIG. 1) and a remote storage system 195 (such as a local- or wide-area network or the World Wide Web) in order to reduce the average delay associated with accesses to system 195. In an exemplary application, local system 180 includes a proxy server coupled to a local-area network, and cache 190 stores Web pages which have recently been accessed and are likely to be accessed again. Once cache 190 has verified that it holds the most recent version of a page requested by a user within local system 180, it may supply that page and avoid the necessity of retrieving it again from remote storage system 195.

As shown in FIG. 4, a cache 200 comprises a set of n cache entries 210-1 through 210-n. Each cache entry 210-i (where index i is an integer from 1 to n) has an address portion 220-i, a data portion 230-i, and an auxiliary portion 240-i. Data portion 230-i holds data from a particular area of the underlying level of the memory hierarchy. This cached area, which may comprise one storage address or several adjacent addresses, is uniquely identified within the underlying level by some combination of the index i and the address portion 220-i. In a direct-mapped cache, for example, the address identifying the cached area is a concatenation of the address portion 220-i (also called a tag) and the index i. In a fully associative cache, on the other hand, address portion 210-i itself uniquely identifies the cached area. Many known addressing schemes for caches exist, ranging from fully associative through set associative to direct mapped.

It is desirable to distinguish (1) the potentially random state of a cache entry at power-up from (2) the state of a cache entry which holds valid information. For this purpose, each auxiliary portion 240 may include a validity field. If necessary, all of the validity fields may be cleared during an initialization routine, and the validity field of an auxiliary portion 240-i may be set when information is cached into address portion 220-i and data portion 230-i.

A cache generally has a smaller capacity for information than the lower level it reflects, so that only a portion of the information stored in the lower level will be present in the cache at any one time. When access to a piece of information is requested, the cache is queried in order to determine whether or not the information is currently stored in the cache (a cache hit or miss, respectively). When a cache miss occurs, the information to be read or written may be entered into the cache in case it is needed again in the near future. If the information is to be entered into a cache which is already full, however, then the information in one or more existing cache entries must be discarded in order to make room for the new information.

In a direct mapped cache, each location in the underlying level is mapped to a unique cache entry. When a replacement situation arises in such a cache, the new information being retrieved from or written to each location can only be stored in a particular one of the cache entries, and no replacement decision exists. On the other hand, if the cache includes a degree of associativity, then each location in the underlying level may be mapped to one among a number of cache entries and a decision must be made regarding which of these entries to replace.

It is desirable to retain information that will be accessed again soon and to replace information that will not be accessed soon or at all. However, an optimal cache replacement strategy requires perfect knowledge of future access requests, and such knowledge is generally unavailable. Therefore, most existing cache replacement strategies (also called cache replacement algorithms or policies or eviction policies) select entries for replacement either at random or according to the limited amount of historical information that may be stored within other fields in auxiliary portions 240. Examples of such historical information include a reference field, which is updated when the information is accessed; an age field, which is updated at predetermined intervals; and a dirty field, which indicates whether the information is still coherent to the contents of the cached area. One type of cache replacement strategy that may be applied to the historical information is a first-in-first-out or FIFO scheme, in which cache entries are selected for replacement (among those entries mapping to the location of the data to be stored) according to the order in which they were created. Another type of replacement strategy is a least-recently-used or LRU scheme, in which cache entries are selected for replacement according to the relative ages of their most recent use.

Cache storage has a high cost per bit, and cost-effectiveness limits the practical size of a cache in a given application. Unfortunately, limiting the size of the cache also limits the amount of storage available to hold a history of accesses to different areas of the cached level, thus restricting the amount of information available for prediction and replacement decisions. Because the history of accesses to a particular cached block is lost upon replacement of that block, limits on cache size may thus result in such undesirable consequences as cache thrashing, wherein information in a particular storage location is repeatedly retrieved and replaced because the cache fails to properly interpret the access history of that location. It is therefore desirable to provide a way to retain more information about access history.

SUMMARY OF THE INVENTION

An apparatus according to an embodiment of the invention includes a cache and a cache extender. The cache has n cache entries which each contain cache entry address information. The cache extender has m entries, wherein each entry has (1) an extender address portion having extender entry address information and (2) an extender auxiliary portion having historical information. The cache and cache extender are related in that the address information of each of the n cache entries relates to the address information of one among the m extender address portions. The address information of each of the m extender address portions also relates to a storage area of an underlying level of a memory hierarchy, and the historical information of the corresponding extender auxiliary portion relates at least in part to requests for access to locations within that storage area.

DETAILED DESCRIPTION OF THE INVENTION

Figure 4:
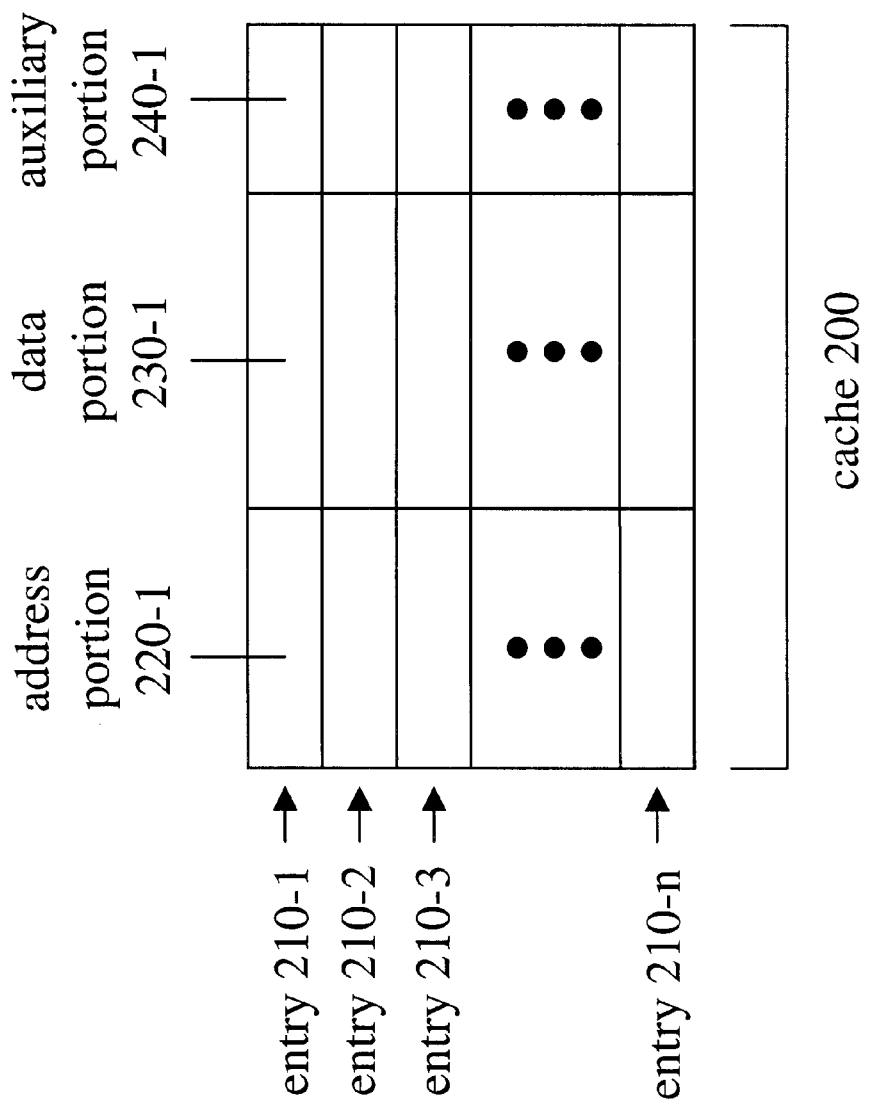
FIG. 4 shows the structure of a cache.
Figure 5:
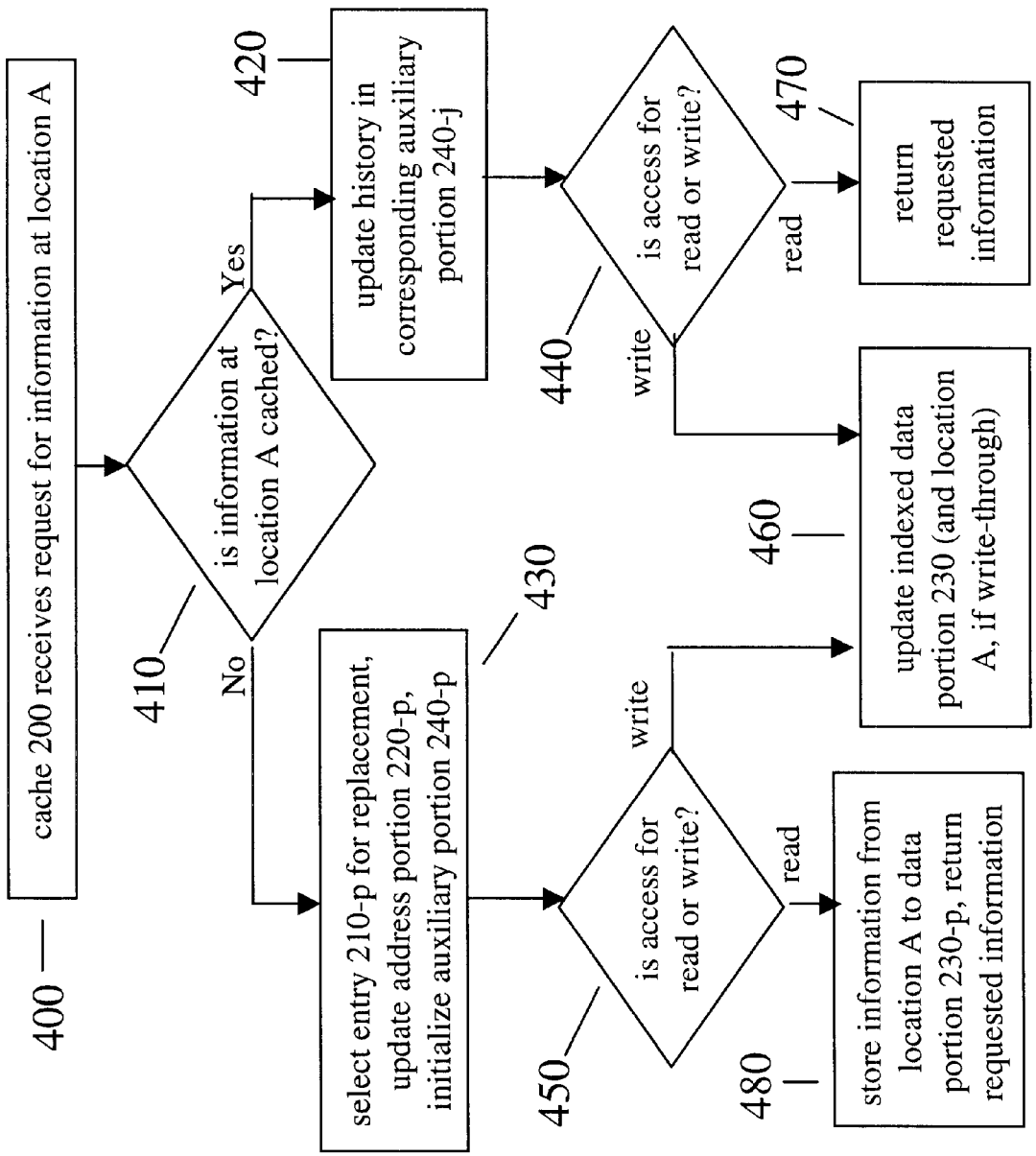
FIG. 5 shows a method for using a cache.

FIG. 5 shows one method for using a cache as shown in FIG. 4. In block 400, cache 200 receives a request to access information stored at location A of the underlying level. In block 410, cache 200 is searched according to its particular addressing scheme to determine whether location A is presently cached. A cache hit occurs if the address portion 220-j of a valid cache entry 210-j (possibly in combination with index j) is determined to match location A. (In the case of a cache reflecting a disk drive, for example, address portion 220-j may indicate the track, sector, platter, and/or cylinder numbers that signify the location of the data, possibly in combination with index j as indicated above.) As noted in block 420, the historical information of auxiliary portion 240-j is updated to record the access.

In block 440, it is determined whether the access request is for reading or writing. If the request is for reading, then the information in data portion 220-j is retrieved from the cache to answer the request as shown in block 470. If the request is for writing, then data portion 230-j is updated with the new information as shown in block 460. If the cache has a write-through policy (i.e. as opposed to write-back), then the new information is written to location A as well.

If a cache miss occurs instead at block 410 (i.e. the address portion of no valid cache entry matches location A), then a cache entry 210-p is selected for replacement (as noted in block 430) according to the cache replacement strategy. If the dirty field in auxiliary portion 240-p is set, the existing contents of data portion 230-p are written back to the address indicated by address portion 220-p (and index p if appropriate). Address portion 220-p is updated to indicate location A, and auxiliary portion 240-p is initialized (e.g. by setting the validity field and clearing the dirty field). Note that when the auxiliary portion 240-p is initialized or otherwise overwritten, any historical information that has been accumulated regarding accesses to data stored in this entry is lost.

In block 450, it is determined whether the access request is for reading or writing. If the request is for reading, then data portion 230-p is updated with the information in location A, and that information is also forwarded to answer the request as shown in block 480. If the request is for writing, then data portion 230-p is updated with the new information as shown in block 460. If the cache has a write-through policy (i.e. as opposed to write-back), then the new information is written to location A as well.

Note that although replacement of a single cache entry is described above, one of ordinary skill in the art will recognize that cache entries need not be of the same size and that a new cache entry may replace more than one existing cache entry. That is to say, more than one cache entry may be selected and processed for replacement, depending on the size of the new cache entry as determined, for example, by the access request.

Figure 6:
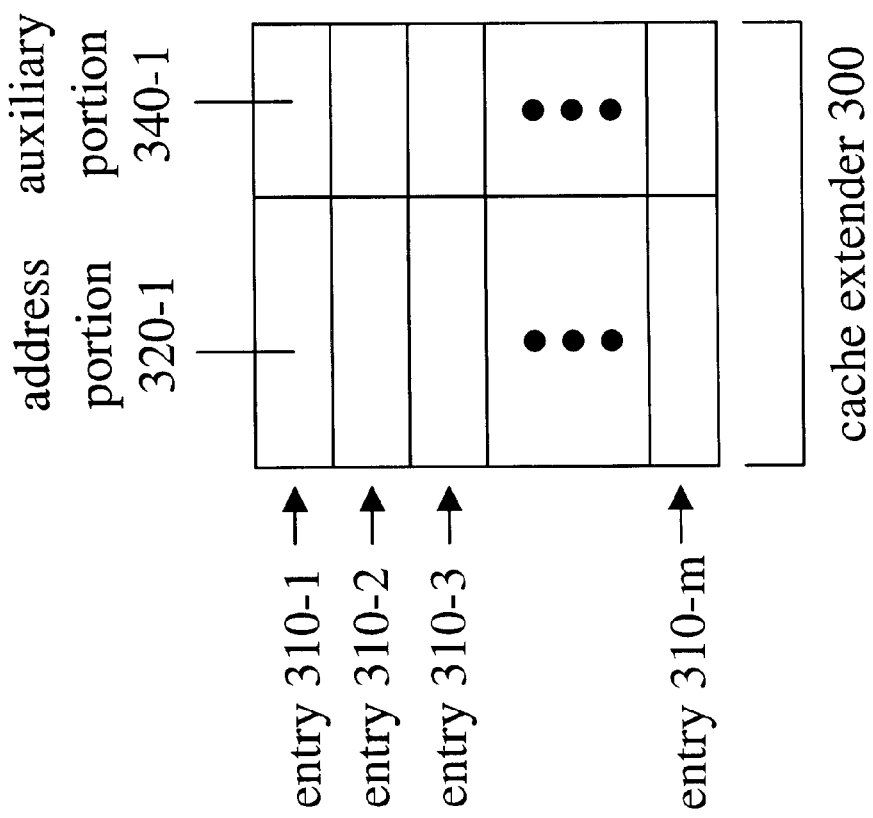
FIG. 6 shows the structure of a cache extender according to a first embodiment of the invention.

FIG. 6 shows a diagram of a cache extender 300 according to a first embodiment of the invention. Like the cache of FIG. 4, cache extender 300 comprises entries 310 which store information corresponding to different portions of underlying storage, each entry 310-i including (1) an address portion 320-i which stores address information indicating (possibly in conjunction with index i) an area of an underlying level of the memory hierarchy and (2) a corresponding auxiliary portion 340-i which stores historical information relating to accesses to the storage areas indicated by address portion 320-i. Like the cache of FIG. 4, the correspondence between address portions 320 and the underlying storage area may be defined by addressing schemes ranging from direct mapped through set associative to fully associative. While the cache of FIG. 4 provides storage for data and/or instructions stored at or destined for particular storage areas, however, cache extender 300 need not hold any such data or instructions.

An address portion 320 of a cache extender entry need not indicate a storage area of the same size as an address portion 220 of the cache 200. However, the address information of one or more cache address portions 220 may indicate storage areas containing locations that are also in storage areas indicated by the address information of a corresponding extender address portion 320. In a method according to one embodiment as described below, for example, at least one location in a storage area indicated by the address information of every valid address portion 220 of the cache resides within a storage area indicated by the address information of an address portion 320 of the cache extender (in broader terms, the address information of at least one of the cache address portions 220 relates to the address information of one among the extender address portions 320).

In some situations, no replacement strategy will be needed for the cache extender. For instance, cache extender 300 may be implemented such that address portions 320 may collectively indicate the entire address space of the underlying storage level at once. In another instance for which no replacement strategy is needed, cache extender 300 uses a direct-mapped addressing scheme.

In other situations, a replacement strategy for cache extender 300 will be necessary or desirable. Such a replacement strategy may be random or may be any other cache replacement strategy suitable for the historical information stored in auxiliary portions 340 (for example, FIFO or LRU or one of their variants). As noted below, the extender replacement strategy may be restricted to prevent the replacement of extender entries that correspond to locations currently cached in cache 200.

Because at least some of the historical information stored in auxiliary portions 340 is related to information stored in data portions 230, this historical information may be used to improve the replacement strategy of cache 200. In implementations where every valid cache entry 210-i has a corresponding cache extender entry 310-i, the historical information in auxiliary portion 340-i may even be used in every replacement decision. Alternatively, it may be desired to use the historical information only for selected replacement decisions. For example, the historical information may be referenced only when insufficient information exists in the relevant auxiliary portions 240 for the cache replacement strategy of cache 200 to make a replacement decision with sufficient confidence. In another example, the historical information may be referenced when it is detected that the performance of cache 200 is below a predetermined threshold, e.g. because of excessive thrashing. In a further example, the historical information may be referenced only for certain types of access (e.g. only for read accesses or only for write accesses) or only for accesses to certain storage areas.

Figure 7:
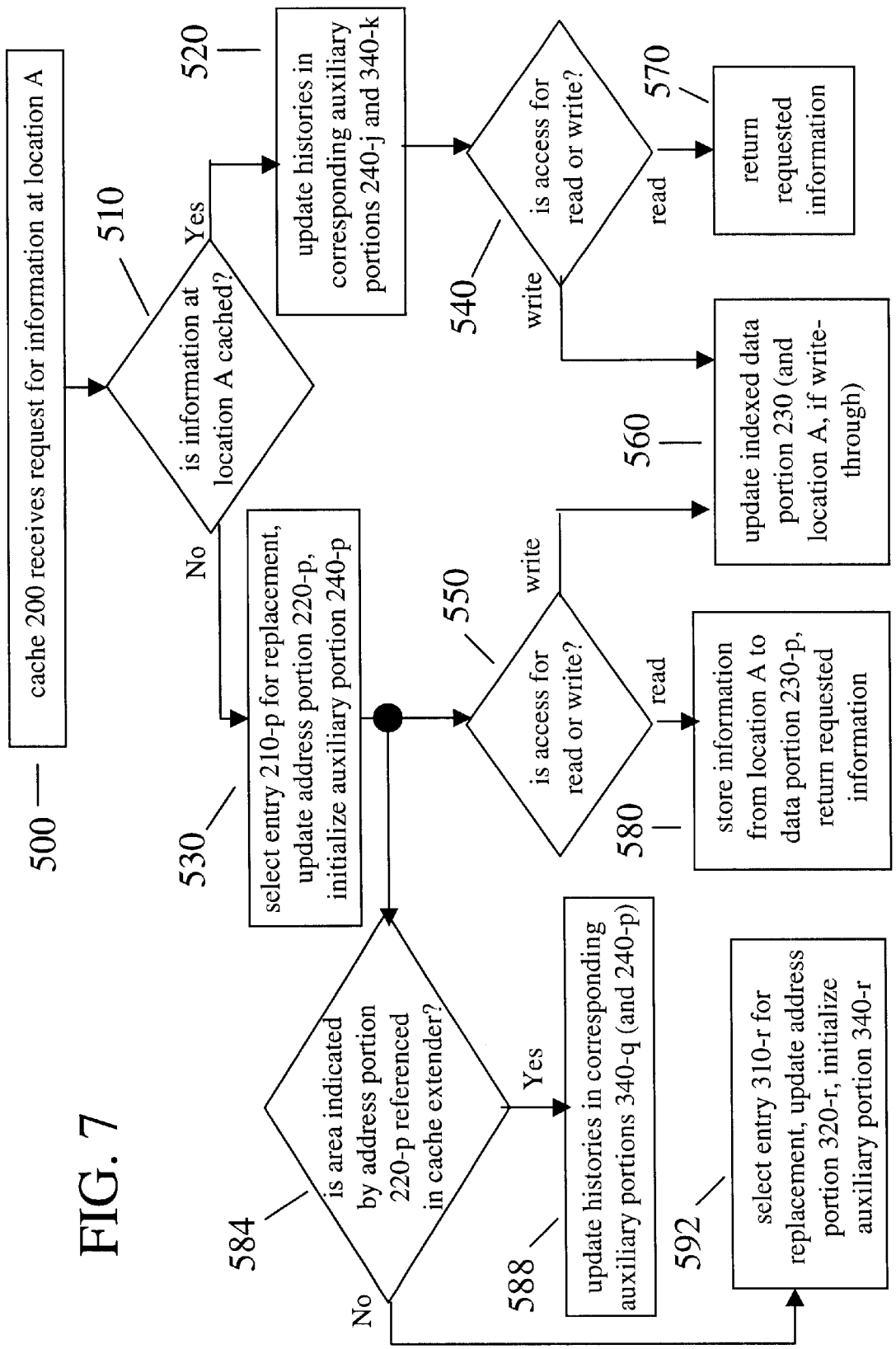
FIG. 7 shows a method for using a cache extender according to the first embodiment.

FIG. 7 shows a method for using a cache extender according to the first embodiment in conjunction with a cache as shown in FIG. 4. In block 500, cache 200 receives a request for information stored at location A of the underlying level. In block 510, cache 200 is searched according to its particular addressing scheme to determine whether location A is presently cached. A cache hit occurs if the address portion 220-j of a valid cache entry 200-j is determined to match location A. In this case, as noted in block 520, the historical information in auxiliary portion 240-j is updated. Additionally, the cache extender entry 310-k which corresponds to cache entry 210-j is identified, and the historical information in its auxiliary portion 340-k is also updated. (In this particular example, we assume that the extender replacement algorithm prevents the replacement of extender entries that correspond to locations currently cached in cache 200. Otherwise, replacement of an extender entry may be performed at block 520 if necessary or desired, with the auxiliary portion of the new extender entry being initialized with historical information from auxiliary portion 240-j.)

In block 540, it is determined whether the access request is for reading or writing. If the request is for reading, then the information in data portion 230-j is retrieved from the cache to answer the request as shown in block 570. If the request is for writing, then data portion 230-j is updated with the new information as shown in block 560. If the cache has a write-through policy (i.e. as opposed to write-back), then the new information is written to location A as well.

If a cache miss occurs instead at block 510, then a cache entry 210-p is selected for replacement (as noted in block 530) according to the cache replacement strategy. If the dirty field in auxiliary portion 240-p is set, the existing contents of data portion 230-p are written back to the address indicated by address portion 220-p (and index p if appropriate). Address portion 220-p is updated to indicate location A, and auxiliary portion 240-p is initialized (e.g. by setting the validity field and clearing the dirty field).

In block 550, it is determined whether the access request is for reading or writing. If the request is for reading, then data portion 230-p is updated with the information in location A, and that information is also forwarded to answer the request as shown in block 580. If the request is for writing, then data portion 230-p is updated with the new information as shown in block 560. If the cache has a write-through policy, then the new information is written to location A as well.

If a cache miss occurs in block 510, cache extender is also searched according to its particular addressing scheme in block 584 to determine whether the area indicated by updated address portion 220-p is referenced by a valid extender entry. If such an entry 310-q is found, then auxiliary portions 240-p and 340-q are updated to record the access as indicated in block 588. If no such entry is found in cache extender 300, then a cache extender entry 310-r is selected for replacement, if necessary, according to the extender replacement algorithm. As indicated in block 592, address portion 320-r is updated and auxiliary portion 340-r is initialized to a predetermined default value or set of default values, at least one of which includes historical information related to this access request.

In one modification of the method described above, information retrieved upon a cache miss in both the cache and the cache extender is not stored in cache 200. In such a scheme, it is assumed that an access request to such a location is random and will not occur again soon (note that such an assumption ignores the principles of locality set forth above). The access is recorded into an entry in the cache extender, however (by replacement of an existing extender entry if necessary or desirable), so that a repeated access to this area may be recognized.

In another modification, auxiliary portion 340 may be modified to indicate different types of access (e.g., accesses for reading and writing) separately. Such a scheme allows certain types of access to be weighted more heavily in a replacement decision for cache 200 than other types of access and may also be used to choose between replacement strategies for cache 200. In one such implementation, a disk array management algorithm uses separated access histories for reads and writes to optimize distribution of data among multiple drives such as within a redundant array of inexpensive disks (RAID) by, for example, storing information likely to be accessed for reading in a different area from information likely to be accessed for writing. In another example, auxiliary portion 340 may be modified to indicate accesses by different applications separately in order to optimize distribution of data within, for example, a local-area network.

Organizational schemes may be applied in one or both among a cache and a cache extender to support the implementation of efficient searching schemes. One such scheme is a balanced tree, which allows entries to be accessed and updated in a time logarithmically related to the total number of entries.

Figure 1:
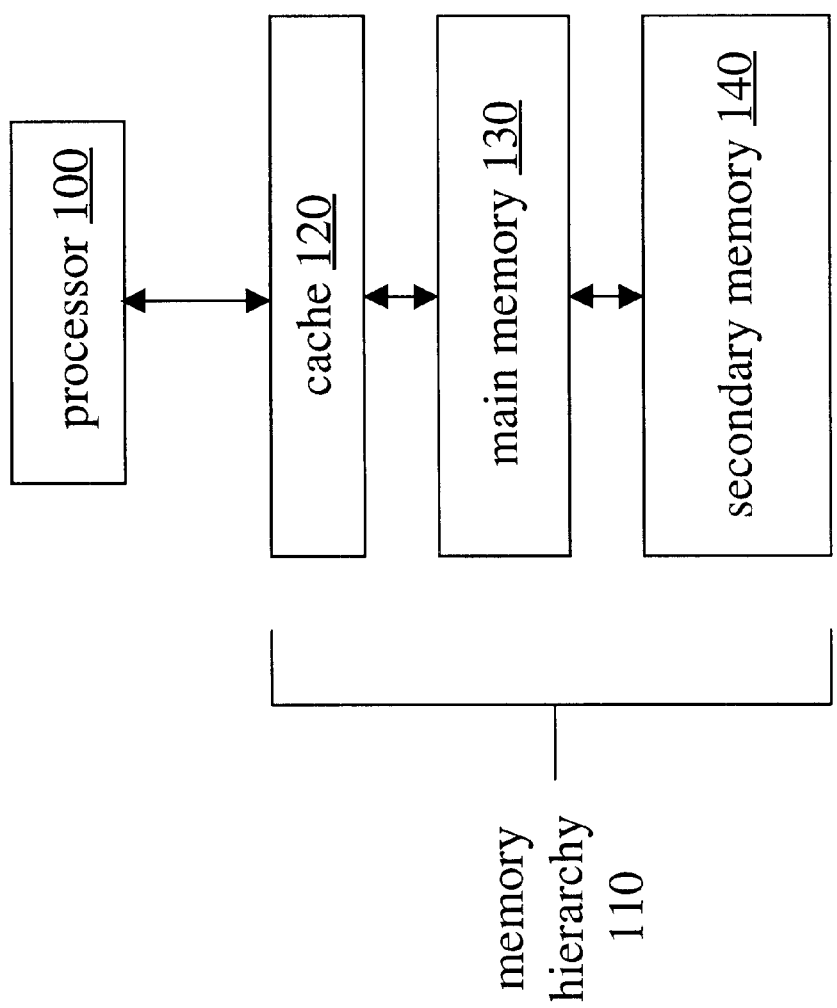
FIG. 1 shows a computing system comprising a processor and a memory hierarchy.
Figure 1A:
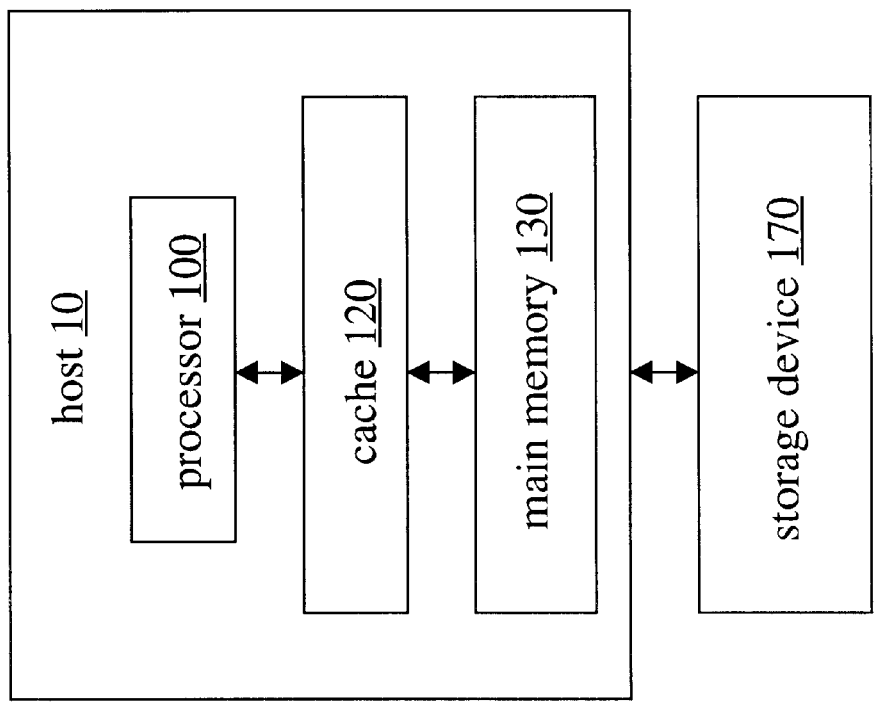
FIG. 1A shows a computing system comprising a host and a storage device.
Figure 2:
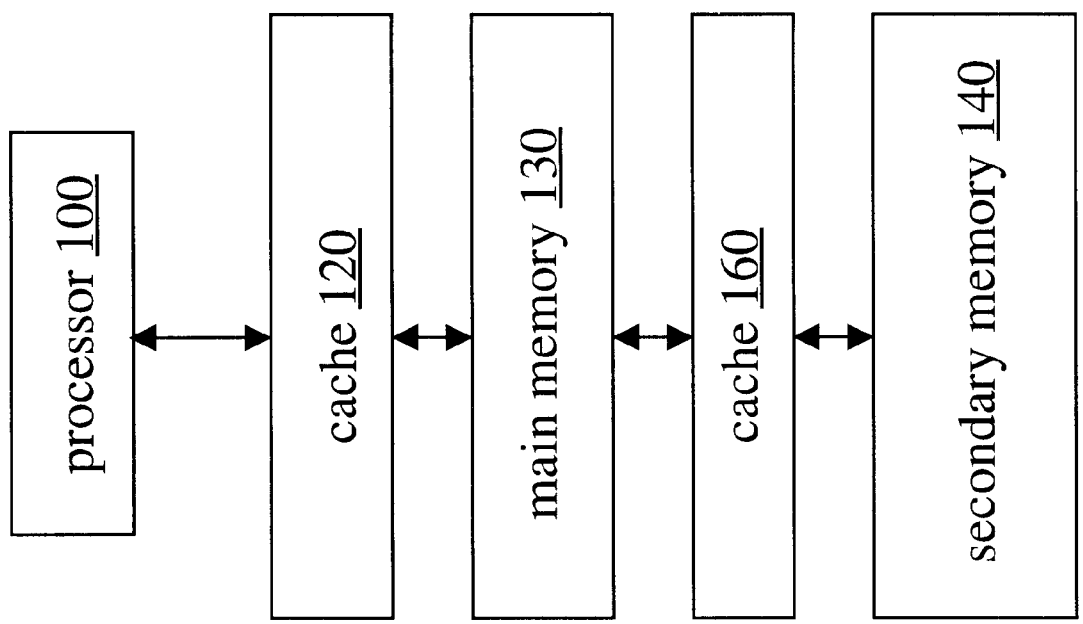
FIG. 2 shows a computing system including a cache between main memory and secondary memory.
Figure 2A:
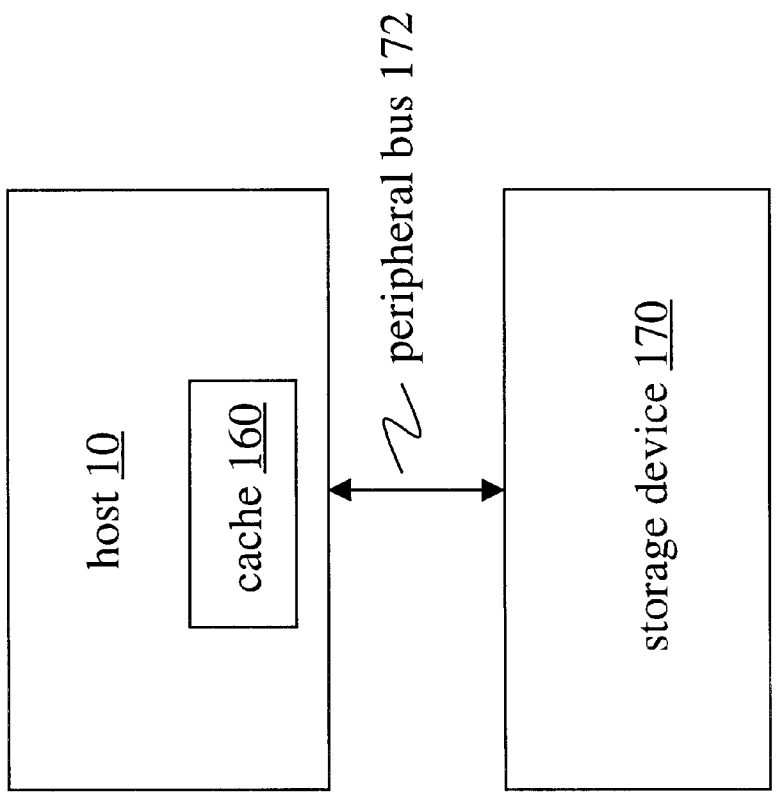
FIG. 2A shows a computing system including a cache for a storage device.
Figure 2B:
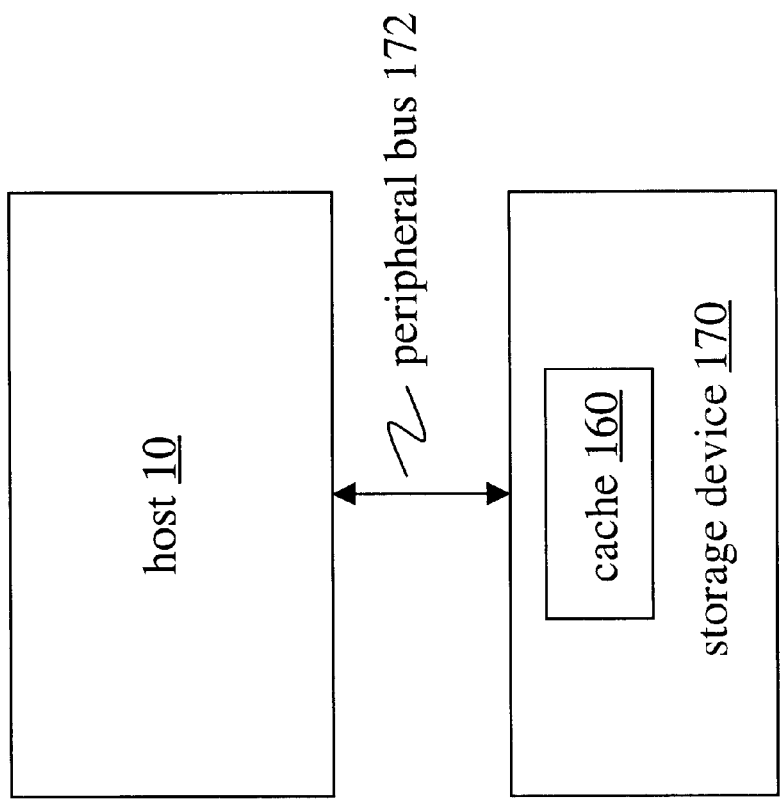
FIG. 2B shows an alternate arrangement for a computing system including a cache for a storage device.
Figure 3:
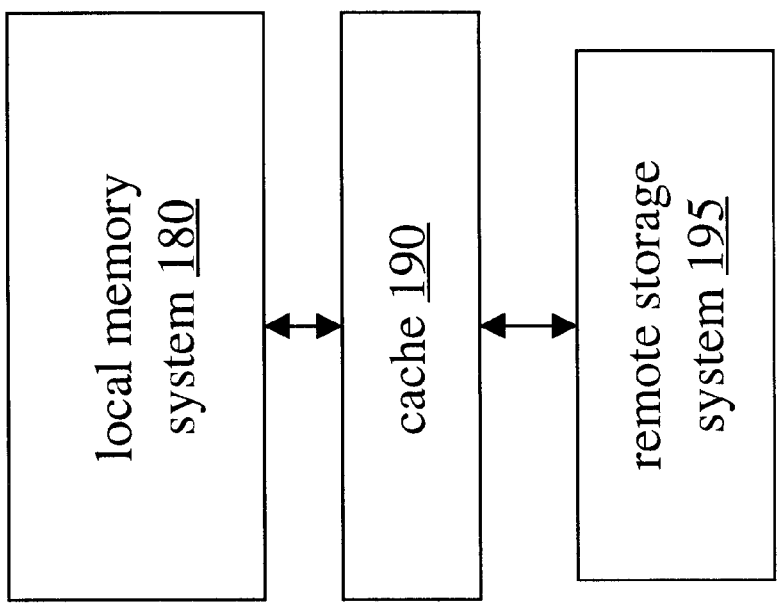
FIG. 3 shows a computing system including a cache for a remote storage system.
Figure 8A:
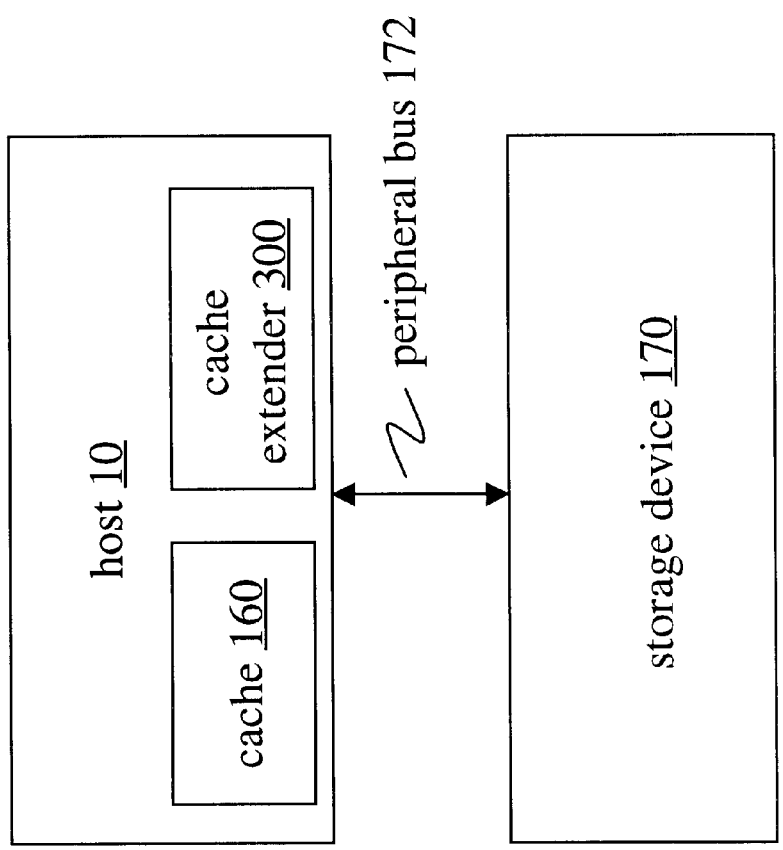
FIG. 8A shows a computing system including a cache extender.
Figure 8B:
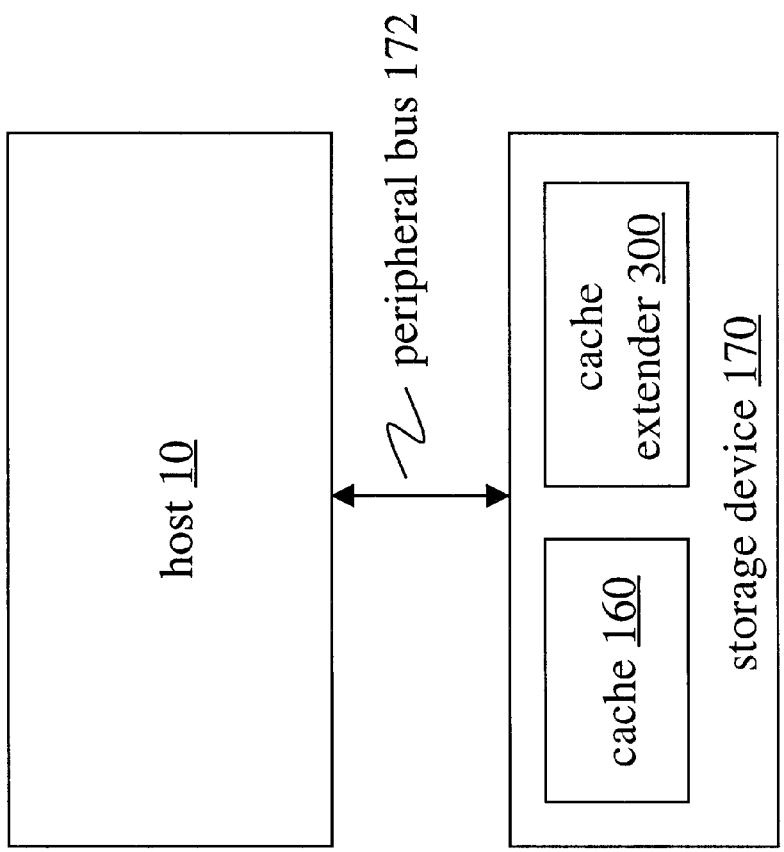
FIG. 8B shows a second arrangement for a computing system including a cache extender.
Figure 8C:
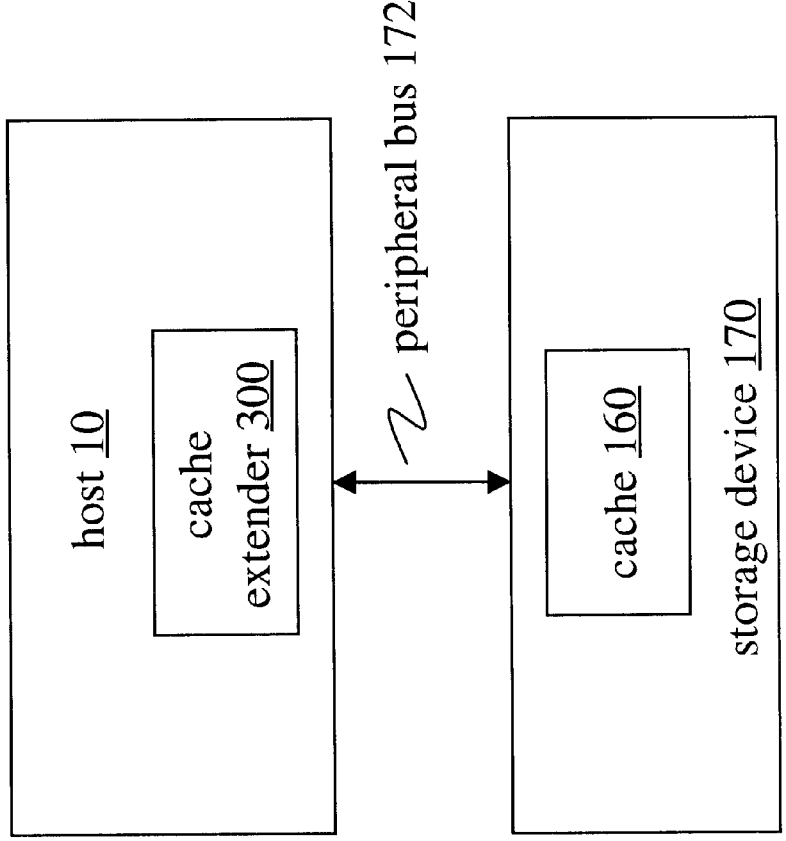
FIG. 8C shows a third arrangement for a computing system including a cache extender.

A method or apparatus according to an embodiment of the invention may be implemented in various configurations. For example, the computing system of FIG. 2A or 2B may be modified to include cache extender 300 together with cache 160 in host 10 or in secondary memory (as represented by storage device 170), as shown in FIGS. 8A and 8B, respectively. In the alternative, cache 160 and cache extender 300 may be split between the two levels as shown in FIG. 8C, for example.

Figure 9:
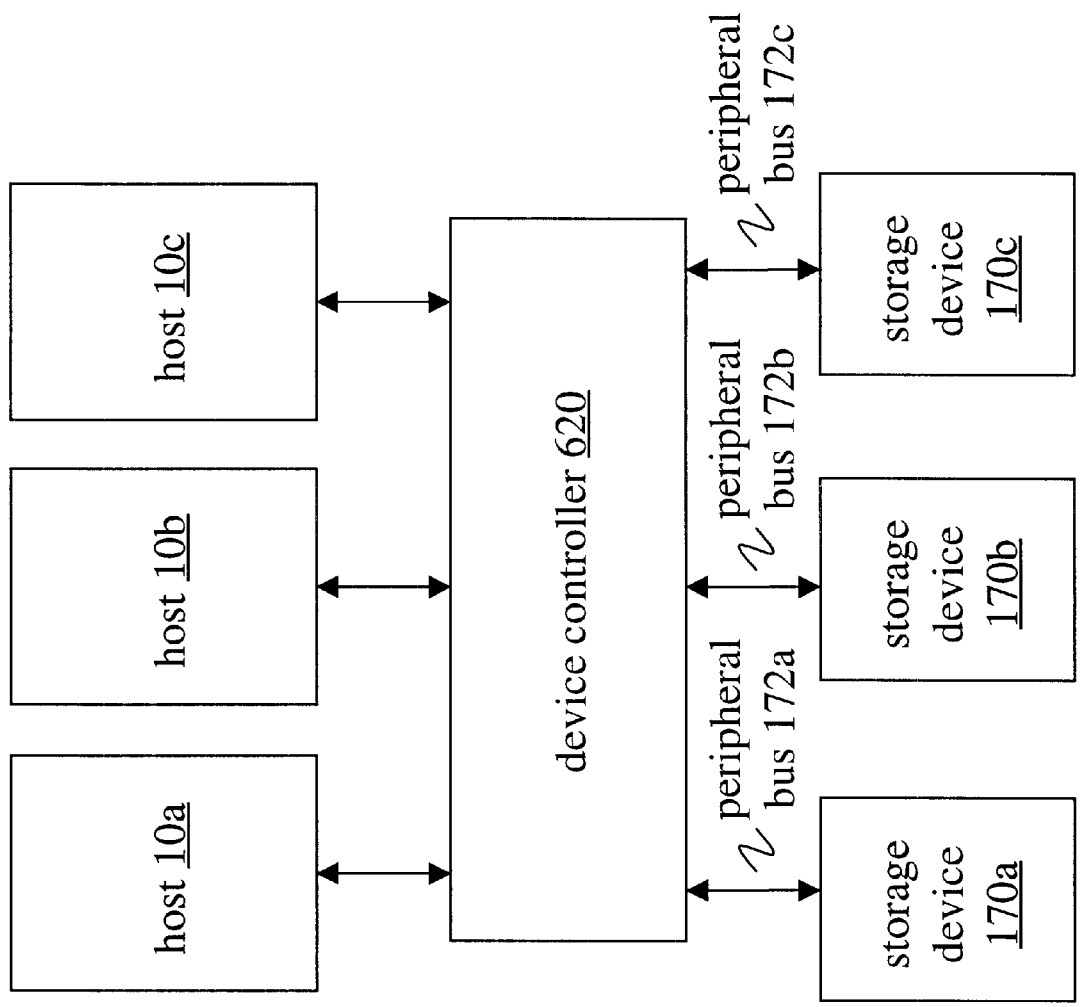
FIG. 9 shows a computing system including a device controller supporting several hosts and several storage devices.
Figure 9A:
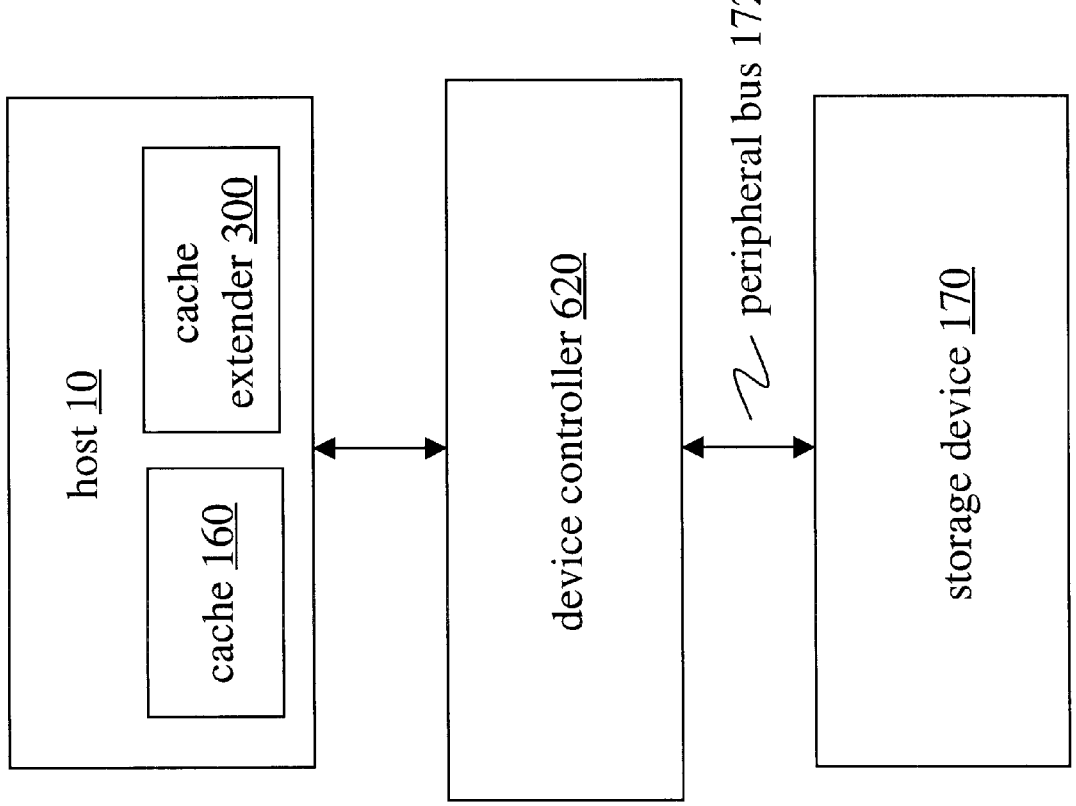
FIG. 9A shows a computing system including a device controller and a cache extender.
Figure 9B:
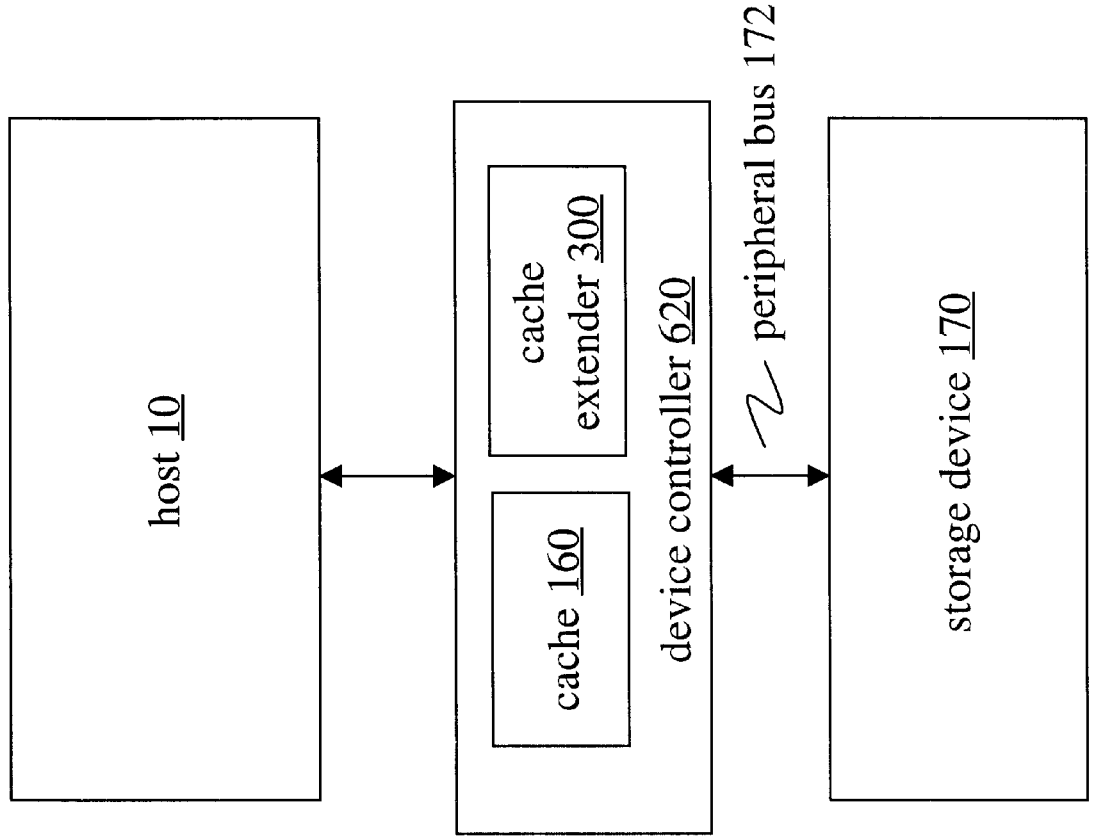
FIG. 9B shows a second arrangement for a computing system including a device controller and a cache extender.
Figure 9C:
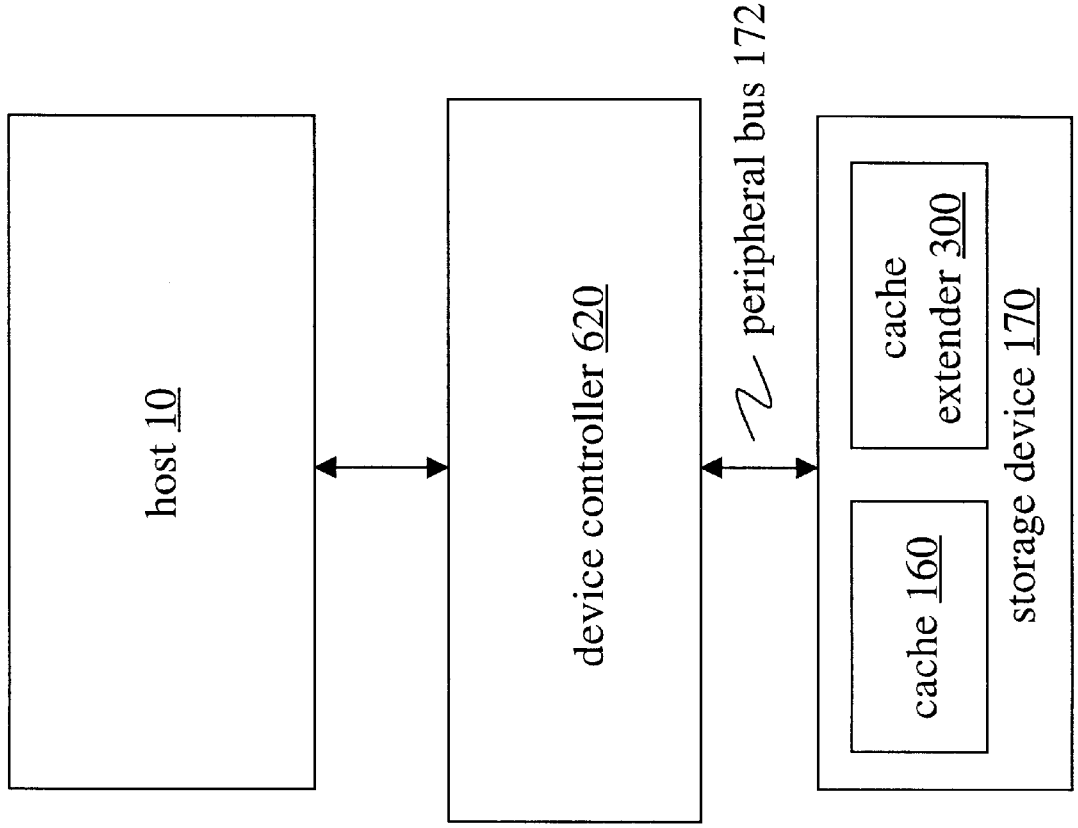
FIG. 9C shows a third arrangement for a computing system including a device controller and a cache extender.
Figure 9D:
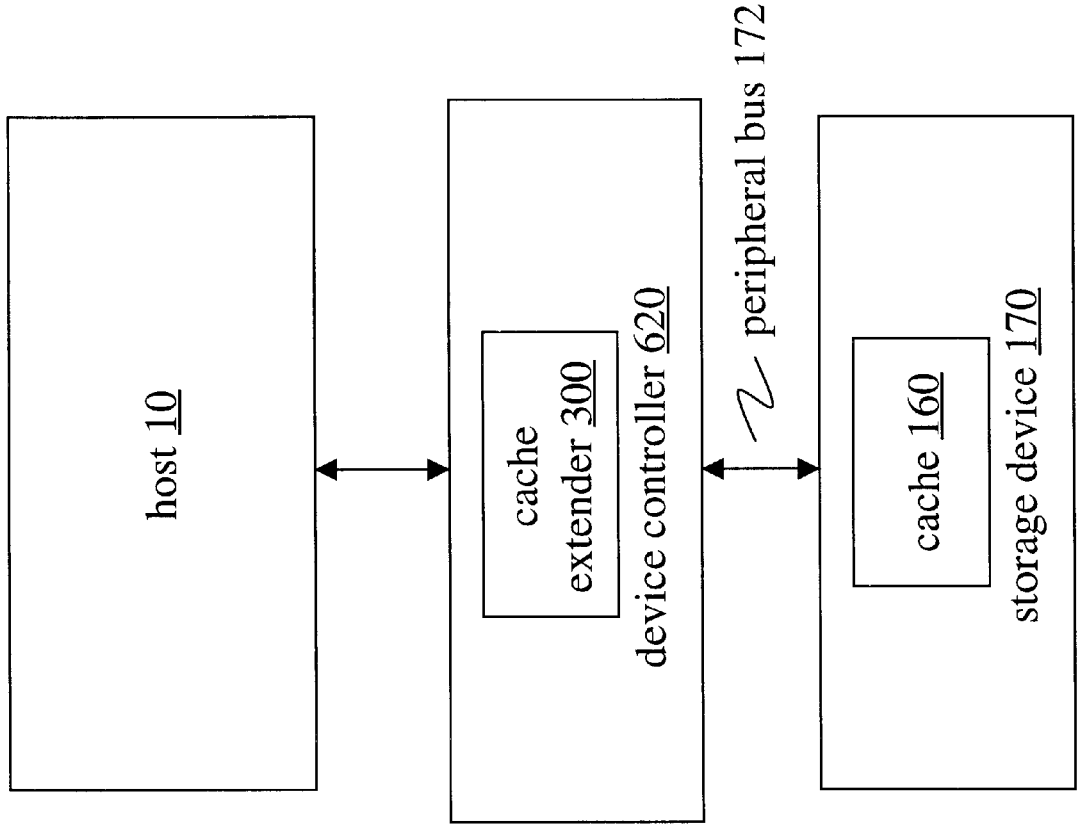
FIG. 9D shows a fourth arrangement for a computing system including a device controller and a cache extender.

A method or apparatus according to an embodiment of the invention may also be used in an environment comprising multiple hosts and/or secondary memory systems (e.g. multiple storage devices). FIG. 9 shows an example of a device controller 620 by which several hosts (each of which may comprise several processors) may be coupled to several storage devices such as disk or tape drives. Communications between hosts 10 and device controller 60 occur over a local or system bus (e.g. one or more among ISA, EISA, VLB, MCA, S-Bus, PCI, VME, PC-104 or the like), while communications between device controller 620 and storage drives 170 occur over a peripheral bus (such as one or more among the examples noted above). FIGS. 9A through 9C illustrate a few representative ways in which cache 160 and cache extender 300 may be distributed between a host 10, device controller 620, and storage device 170.

Figure 10A:
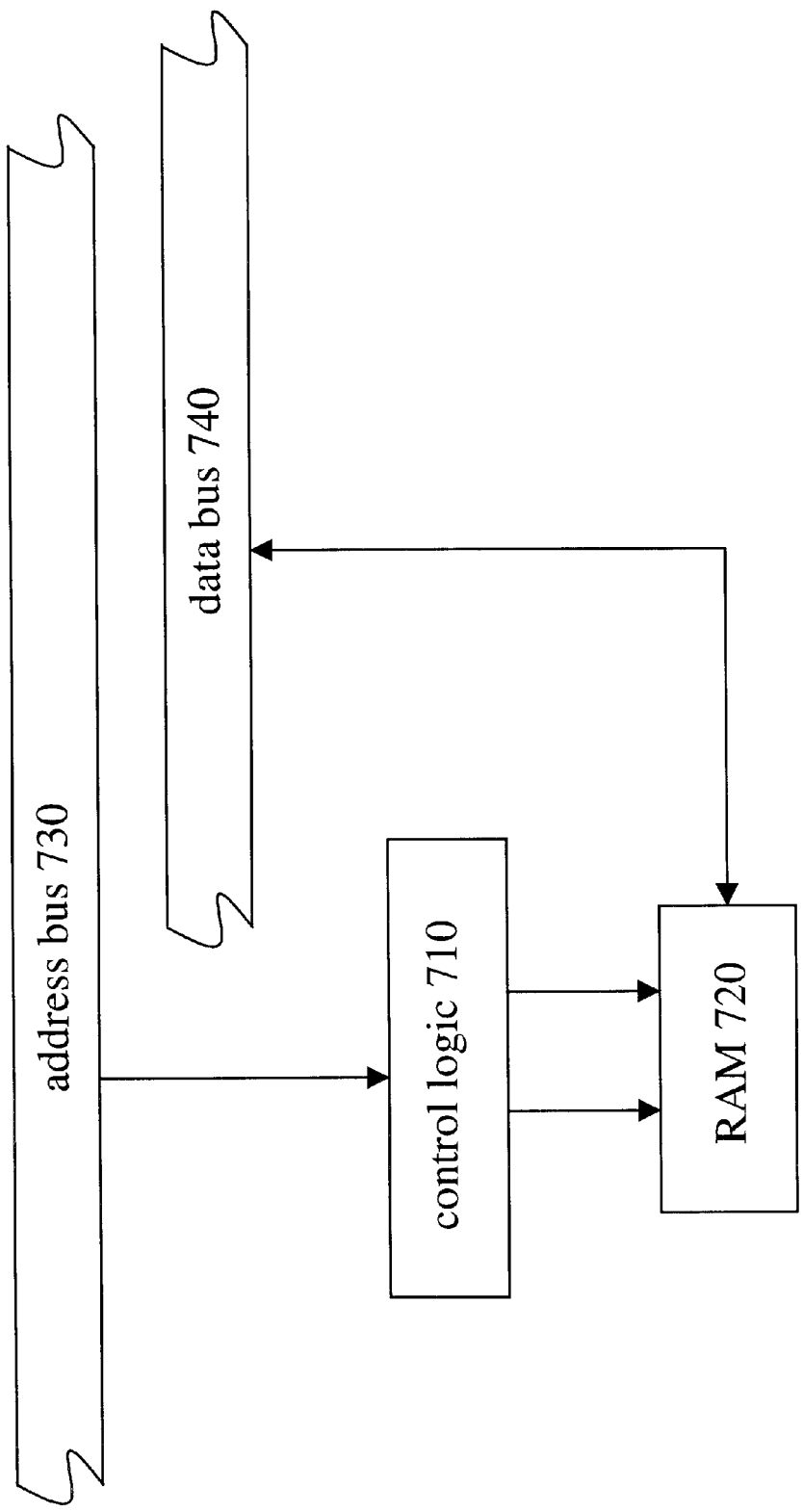
FIG. 10A shows a data processing circuit including cache control logic and cache and cache extender RAM.
Figure 10B:
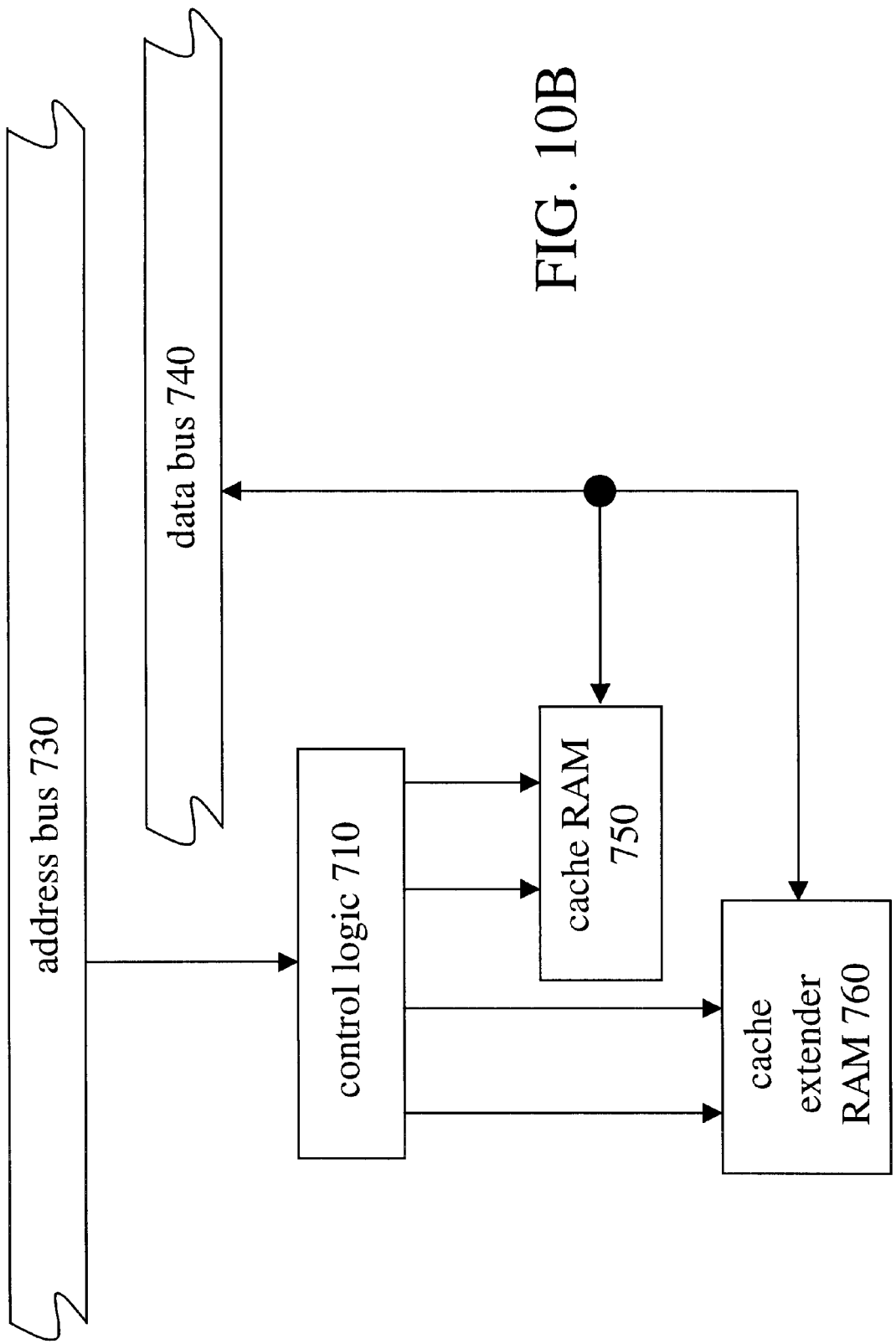
FIG. 10B shows a data processing circuit including cache control logic, cache RAM, and cache extender RAM.
Figure 10C:
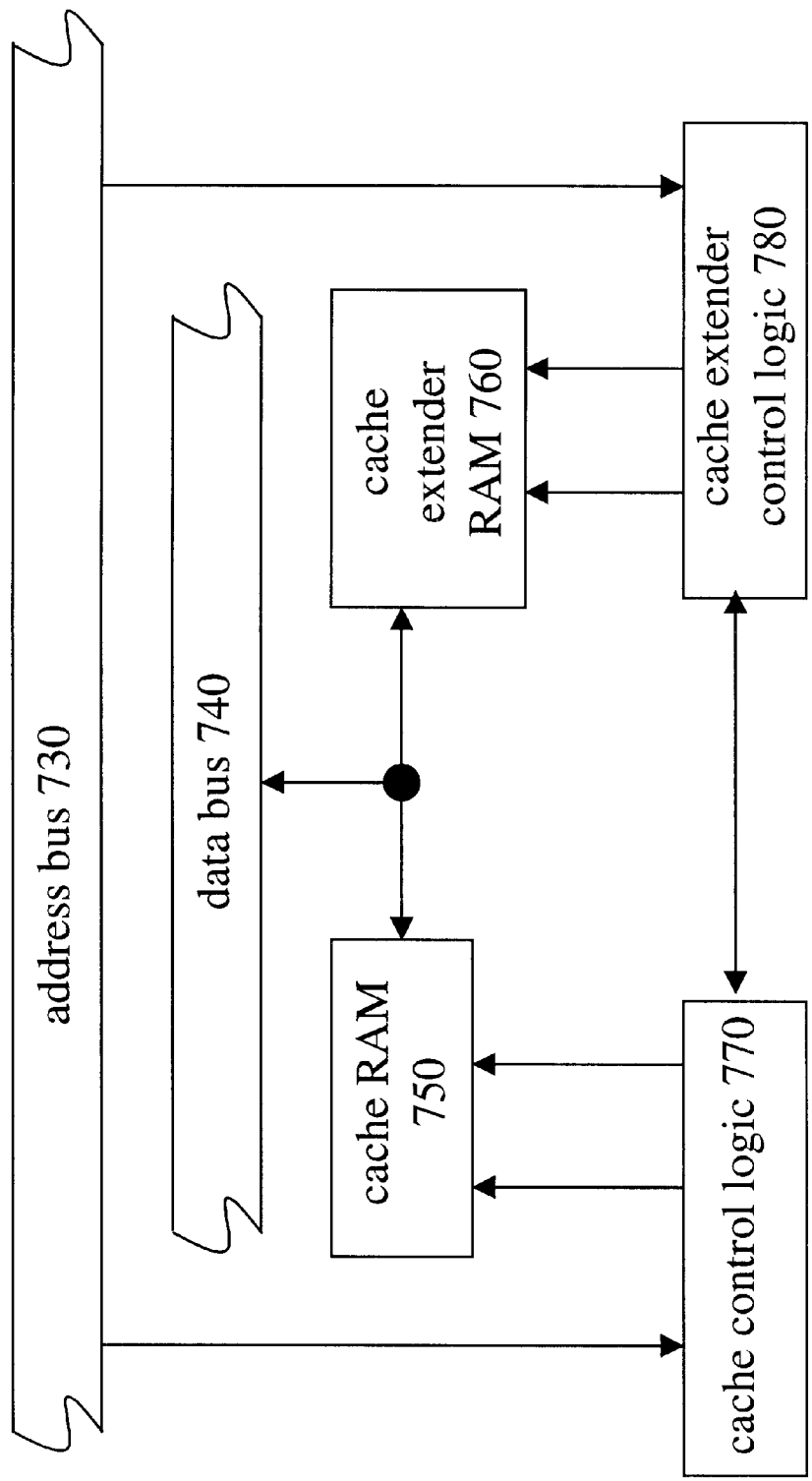
FIG. 10 shows a data processing circuit including cache control logic, cache extender control logic, cache RAM, and cache extender RAM.

Likewise, a method or apparatus according to an embodiment of the invention may be implemented in hardware, firmware, and/or software. In one implementation, as shown in FIG. 10A, a cache 200 and corresponding cache extender 300 may be implemented in the same hardware unit comprising control logic circuit 710 and random-access memory (RAM) 720, wherein addresses of storage locations to which accesses are requested arrive over address bus 730 and information for reading and writing is exchanged over data bus 740. In the alternative implementation of FIG. 10B, storage for the entries of cache 200 and cache extender 300 is divided between cache RAM 750 and cache extender RAM 760, respectively, while control logic circuit 710 continues to support management activities such as addressing and replacement for both cache 200 and cache extender 300. In another alternative embodiment as shown in FIG. 10C, the control functions for cache 200 and cache extender 300 are divided between cache control logic circuit 770 and cache extender control logic circuit 780, respectively. Note that although the control logic is divided in this example, a line of communication exists between control logic circuits 770 and 780 so that the operation of the two circuits may be coordinated.

Figure 11:
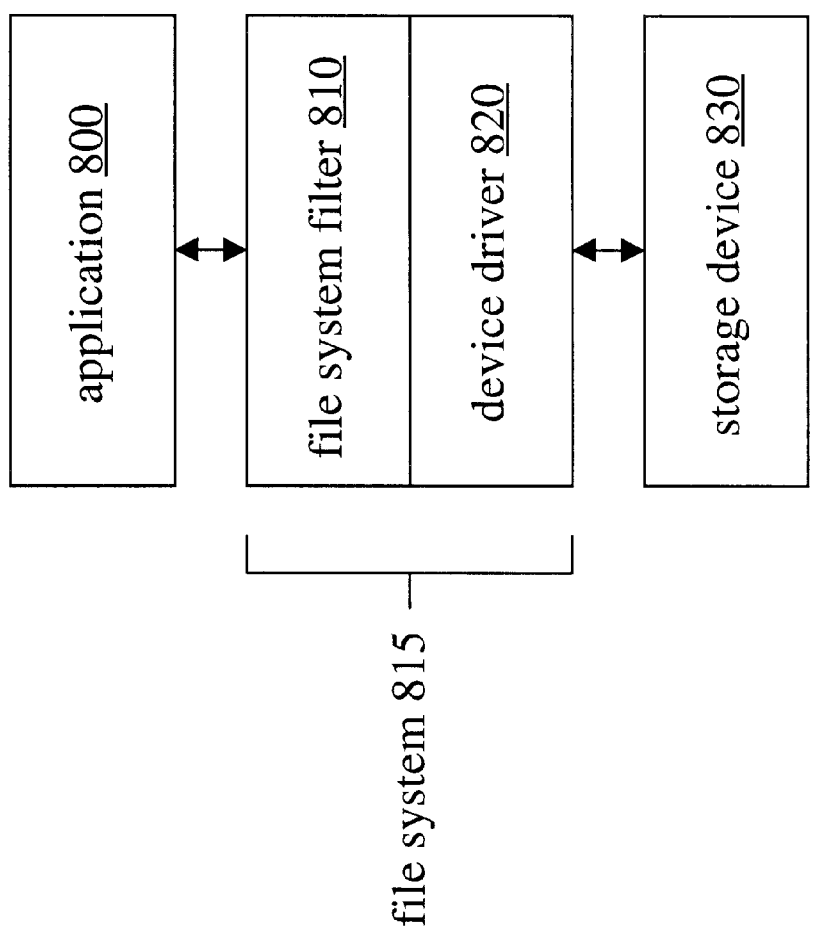
FIG. 11 shows a computing system including an application, a file system, and a storage device.
Figure 12:
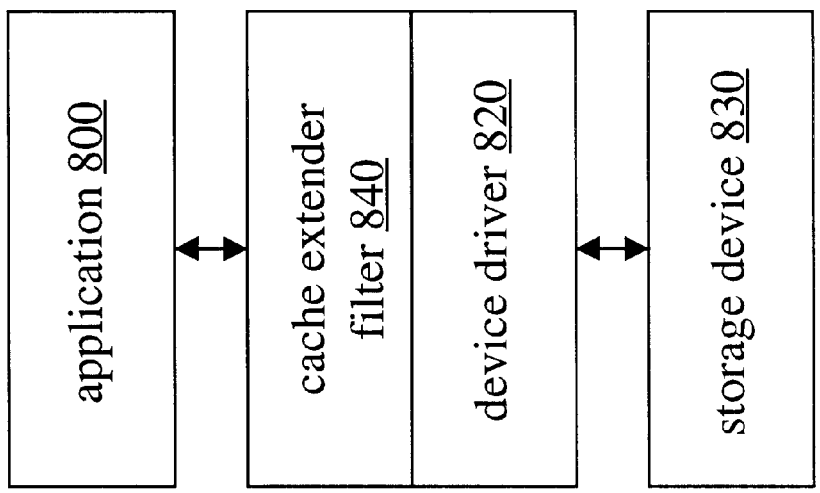
FIG. 12 shows a further implementation of a method according to an embodiment of the invention.

Any of the hardware configurations described above may also be implemented in software or firmware. FIG. 11 shows a background model for an alternative software implementation of a method or apparatus according to an embodiment of the invention. In this model, a software application 800 issues requests for information to a software component called a file system 815 which manages information as files stored on a storage device 830 (e.g. one or more disk or tape drives). File system 815 includes a device driver layer 820, which interfaces with the storage device, and a file system filter layer 810, which provides a means for monitoring and modifying information and requests that pass between application 800 and device driver 820. It is known in the art to use a file system filter for such applications as encryption, compression, and virus detection. In an implementation of a method according to an embodiment of the invention as shown in FIG. 12, cache extender filter layer 840 monitors the access requests of software application 800, modifying or diverting them according to the method in order to decrease the apparent average response time of storage device 830. Such an implementation may be varied, for example, by exchanging the positions of cache extender filter layer 840 and device driver layer 820 in FIG. 12 and/or by adding additional layers in serial and/or parallel fashion to one or more of these layers.

The foregoing description of the preferred embodiments is provided to enable any person skilled in the art to make or use the present invention. Various modifications to these embodiments will be readily apparent to those skilled in the art, and the generic principles presented herein may be applied to other embodiments without use of the inventive faculty. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

We claim:

1. An apparatus comprising:
a cache comprising a number n of cache entries, each of the cache entries having cache entry address information; and
a cache extender comprising a number m of extender entries, each extender entry comprising an extender address portion and an extender auxiliary portion,
wherein each extender address portion has extender entry address information, and
wherein the cache entry address information of each of the n cache entries relates to the extender entry address information of one among the m extender address portion, and
wherein a storage area of an underlying level of a memory hierarchy is related to the extender entry address information of each of the m extender address portions,
wherein each of the m extender auxiliary portions has historical information, the historical information relating at least in part to requests for access to locations within the storage area related to the extender entry address information of the corresponding extender address portion, and
wherein the m extender auxiliary portions comprise historical information relating to requests for access to locations within the storage area no longer having corresponding entries in the cache.

2. The apparatus according to claim 1, wherein the requests for access are issued by at least one processor within a host, and
wherein at least one among the cache and the cache extender are addressable by the at least one processor over at least one among a local bus and a system bus.

3. The apparatus according to claim 1, wherein the requests for access are issued by at least one processor within a host, and
wherein transmission of the requests for access between the host and at least one among the cache and the cache extender occurs at least in part over a peripheral bus.

4. The apparatus according to claim 1, wherein a device controller receives one among (1) a request to retrieve information stored in the memory hierarchy and (2) a request to store information to the memory hierarchy from at least one host over at least one among a local bus and a system bus, and
wherein the device controller issues one among (3) a request to retrieve information stored in the memory hierarchy and (4) a request to store information to the memory hierarchy to at least one storage device at least in part over a peripheral bus, and
wherein at least one among the cache and the cache extender are implemented within the device controller.

5. The apparatus according to claim 1, wherein historical information of each extender auxiliary portion which relates to requests for access for reading is stored separately from historical information of the same extender auxiliary portion which relates to requests for access for writing.

6. The apparatus according to claim 1, wherein the requests for access occur through a file system, the file system comprising a filter layer, and
wherein at least one among the cache and the cache extender are implemented in the filter layer.

7. The apparatus according to claim 1, wherein the cache receives a request for access to a selected location within a storage area of an underlying level of the memory hierarchy, and
wherein the historical information in one among the extender auxiliary portions is altered based at least in part on the request for access to the selected location.

8. The apparatus according to claim 7, wherein the requests for access occur through a file system, the file system comprising a filter layer, and
wherein at least one among the cache and the cache extender are implemented in the filter layer.

9. The apparatus according to claim 8, wherein if the cache entry address information in each of the n cache entries is determined not to match the selected location, and the selected location is determined to not be within the storage areas related to the extender entry address information of each of the extender address portions, then at least one among the extender entries is replaced according to a replacement strategy.

10. The apparatus according to claim 9, the replacement strategy being one among a random replacement strategy, a first-in-first-out replacement strategy, and a least-recently-used replacement strategy.

11. The apparatus according to claim 7, wherein if the cache entry address information in each of the n cache entries is determined not to match the selected location, and the selected location is determined to not be within the storage areas related to the extender entry address information of each of the extender address portions, then at least one among the extender entries is replaced according to a replacement strategy.

12. The apparatus according to claim 11, the replacement strategy being one among a random replacement strategy, a first-in-first-out replacement strategy, and a least-recently-used replacement strategy.

13. The apparatus according to claim 7, wherein if an address based at least in part on the cache entry address information of one among the cache entries matches the selected location, the historical information in a selected one among the extender auxiliary portions is altered, wherein the address information of the extender address portion corresponding to the selected one among the extender auxiliary portions is related to the cache entry address information of said one among the cache entries.

14. The apparatus according to claim 13, wherein if the cache entry address information in each of the n cache entries is determined not to match the selected location, and the selected location is determined to not be within the storage areas related to the extender entry address information of each of the extender address portions, then at least one among the extender entries is replaced according to a replacement strategy.

15. The apparatus according to claim 14, the replacement strategy being one among a random replacement strategy, a first-in-first-out replacement strategy, and a least-recently-used replacement strategy.

16. The apparatus according to claim 13, wherein the requests for access occur through a file system, the file system comprising a filter layer, and wherein at least one among the cache and the cache extender are implemented in the filter layer.

17. The apparatus according to claim 16, wherein if the cache entry address information in each of the n cache entries is determined not to match the selected location, and the selected location is determined to not be within the storage areas related to the extender entry address information of each of the extender address portions, then at least one among the extender entries is replaced according to a replacement strategy.

18. The apparatus according to claim 17, the replacement strategy being one among a random replacement strategy, a first-in-first-out replacement strategy, and a least-recently-used replacement strategy.

19. A method comprising:
receiving a request for access to a location that is not cached, said location being within a storage area of an underlying level of a memory hierarchy;
selecting a cache entry;
if the storage area is indicated by address information of a valid entry in a cache extender, recording historical information in the cache extender; and
if the storage area is not indicated by address information of a valid entry in the cache extender, initializing an entry in the cache extender,
wherein selecting a cache entry is based at least in part on historical information recorded in the cache extender,
wherein initializing an entry in the cache extender comprises recording historical information in the cache extender, the historical information relating at least in part to requests for access to locations within the storage area related to the extender entry address information of the corresponding extender address portion, and wherein the cache extender historical information comprises historical information relating to requests for access to locations in the storage area no longer having corresponding entries in the cache.

20. The method according to claim 19, wherein initializing an entry in the cache extender comprises selecting an entry in the cache extender according to a replacement strategy.

21. The method according to claim 20, the replacement strategy being one among a random replacement strategy, a first-in-first-out replacement strategy, and a least-recently-used replacement strategy.

22. The method according to claim 20, wherein the request for access is issued to a file system, the file system comprising a filter layer, and wherein at least one among the cache and the cache extender are implemented in the filter layer.

23. The method according to claim 19, wherein historical information which relates to requests for read access is recorded in the cache extender separately from historical information which relates to requests for write access.

24. The method according to claim 19, wherein the request for access is issued to a file system, the file system comprising a filter layer, and wherein at least one among the cache and the cache extender are implemented in the filter layer.

25. The method according to claim 19, further comprising:
if the request is for a write access, storing information to the selected cache entry.

26. The method according to claim 25, further comprising:
if the request is for a read access, storing information from the location to the selected cache entry.

27. The method according to claim 25, wherein the request for access is issued to a file system, the file system comprising a filter layer, and wherein at least one among the cache and the cache extender are implemented in the filter layer.

28. A data storage medium having machine-readable code stored thereon, the machine-readable code comprising instructions executable by a machine, the instructions, when executed by a machine, causing:
receiving a request for access to a location that is not cached, said location being within a storage area of an underlying level of a memory hierarchy;
selecting a cache entry;
if the storage area is indicated by address information of a valid entry in a cache extender, recording historical information in the cache extender; and
if the storage area is not indicated by address information of a valid entry in the cache extender, initializing an entry in the cache extender,
wherein selecting a cache entry is based at least in part on historical information recorded in the cache extender,
wherein initializing an entry in the cache extender comprises recording historical information in the cache extender, and
wherein the cache extender historical information comprises historical information relating to requests for access to locations in the storage area no longer having corresponding entries in the cache.

29. The medium according to claim 28, wherein initializing an entry in the cache extender comprises selecting an entry in the cache extender according to a replacement strategy.

30. The medium according to claim 29, the replacement strategy being one among a random replacement strategy, a first-in-first-out replacement strategy, and a least-recently-used replacement strategy.

31. The medium according to claim 29, wherein the request for access is issued to a file system, the file system comprising a filter layer, and
wherein at least one among the cache and the cache extender are implemented in the filter layer.

32. The medium according to claim 28, wherein historical information which relates to requests for read access is recorded in the cache extender separately from historical information which relates to requests for write access.

33. The medium according to claim 28, wherein the request for access is issued to a file system, the file system comprising a filter layer, and
wherein at least one among the cache and the cache extender are implemented in the filter layer.

34. The medium according to claim 28, further comprising:
if the request is for a write access, storing information to the selected cache entry.

35. The medium according to claim 34, further comprising:
if the request is for a read access, storing information from the location to the selected cache entry.

36. The medium according to claim 35, wherein the request for access is issued to a file system, the file system comprising a filter layer, and
wherein at least one among the cache and the cache extender are implemented in the filter layer.

37. An integrated circuit, said circuit comprising an array of logic elements, said array being configured to perform a method comprising:
receiving a request for access to a location that is not cached, said location being within a storage area of an underlying level of a memory hierarchy;
selecting a cache entry;
if the storage area is indicated by address information of a valid entry in a cache extender, recording historical information in the cache extender; and
if the storage area is not indicated by address information of a valid entry in the cache extender, initializing an entry in the cache extender,
wherein selecting a cache entry is based at least in part on historical information recorded in the cache extender,
wherein initializing an entry in the cache extender comprises recording historical information in the cache extender, and
wherein the cache extender historical information comprises historical information relating to requests for access to locations in the storage area no longer having corresponding entries in the cache.

38. The integrated circuit according to claim 37, wherein initializing an entry in the cache extender comprises selecting an entry in the cache extender according to a replacement strategy.

39. The integrated circuit according to claim 38, the replacement strategy being one among a random replacement strategy, a first-in-first-out replacement strategy, and a least-recently-used replacement strategy.

40. The integrated circuit according to claim 37, wherein historical information which relates to requests for read access is recorded in the cache extender separately from historical information which relates to requests for write access.

41. The integrated circuit according to claim 37, wherein the method further comprises:
if the request is for a write access, storing information to the selected cache entry.

42. The integrated circuit according to claim 41, wherein the method further comprises:
if the request is for a read access, storing information from the location to the selected cache entry.

43. An apparatus for extending cache history, comprising:
a cache with a plurality of cache entries, each cache entry storing cache entry address information and cached data;
a cache extender with a plurality of cache extender entries, each cache extender entry storing cache extender address information and cache extender auxiliary information; and
an underlying memory;
means for implementing a replacement strategy for said plurality of cache entries using at least said cache extender auxiliary information
wherein the cache extender auxiliary information comprises historical information relating to requests for access to locations in the underlying memory that no longer have corresponding entries in the cache.

44. The apparatus as claimed in claim 43, wherein said replacement strategy is one of a random replacement strategy, a first-in-first-out replacement strategy and a least-recently used replacement strategy.

45. An apparatus for extending cache history, said apparatus comprising:
a cache with a plurality of cache entries, each of said plurality of cache entries storing cache entry address information;
a cache extender with a plurality of cache extender entries, each of said plurality of cache extender entries storing cache extender address information and cache extender auxiliary information; and
an underlying memory;
wherein said cache entry address information corresponds to one of said plurality of cache extender entries and said cache extender address information corresponds to a storage location of said underlying memory;
wherein said cache extender auxiliary information is historical information, said historical information relating at least in part to the number of requests for access to said storage location of said underlying memory specified by said cache extender address information, and
wherein said cache extender auxiliary information comprises historical information relating to requests for access to locations in underlying memory that no longer have corresponding entries in the cache.

46. The apparatus as claimed in claim 45, further comprising a means for implementing a replacement strategy for said plurality of cache entries, wherein said replacement strategy uses at least the historical information for implementing said replacement strategy.

47. The apparatus as claimed in claim 46, wherein said replacement strategy is one of a random replacement strategy, a first-in-first-out replacement strategy and a least-recently used replacement strategy.

* * * * *